(12) United States Patent
Markus et al.

(10) Patent No.: US 11,364,640 B1
(45) Date of Patent: Jun. 21, 2022

(54) AUTOMATIC END-OF-ARM TOOL CHANGERS FOR AUTOMATED ROBOTIC SYSTEMS

(71) Applicant: Sirius Automation Group Inc., Buffalo Grove, IL (US)

(72) Inventors: Lawrence Markus, Mundelein, IL (US); Justin Lu, Riverwoods, IL (US)

(73) Assignee: Sirius Automation Group Inc., Buffalo Grove, IL (US)

( * ) Notice: Subject to any disclaimer, the term of this patent is extended or adjusted under 35 U.S.C. 154(b) by 0 days.

(21) Appl. No.: 17/232,694

(22) Filed: Apr. 16, 2021

(51) Int. Cl.
   *B25J 15/04* (2006.01)
(52) U.S. Cl.
   CPC .................. *B25J 15/0408* (2013.01)
(58) Field of Classification Search
   CPC ............... B25J 15/0808; B25J 15/0425; B25J 15/0033; B25J 18/00
   USPC ........................................... 294/213
   See application file for complete search history.

(56) References Cited

U.S. PATENT DOCUMENTS

| | | | | |
|---|---|---|---|---|
| 4,549,846 | A * | 10/1985 | Torii ................. | B25J 15/04 901/30 |
| 4,815,780 | A * | 3/1989 | Obrist ............... | B25J 15/04 294/86.4 |
| 8,007,741 | B1 | 8/2011 | Heyes | |
| 8,757,690 | B2 | 6/2014 | Gao et al. | |
| 8,857,877 | B2 | 10/2014 | Lin et al. | |
| 9,808,933 | B2 | 11/2017 | Lin et al. | |
| 2010/0034701 | A1 | 2/2010 | Pedrazzini | |
| 2010/0312379 | A1 | 12/2010 | Pedrazzini | |
| 2013/0336755 | A1 | 12/2013 | Neeper | |
| 2016/0023213 | A1 | 1/2016 | Richardson | |
| 2016/0229565 | A1 | 8/2016 | Margner | |
| 2017/0239823 | A1 * | 8/2017 | Bellandi ............... | F16L 37/252 |
| 2019/0358830 | A1 * | 11/2019 | Nishio ................. | B25J 15/0433 |
| 2020/0016772 | A1 * | 1/2020 | Motowaki ............ | B25J 15/0408 |
| 2020/0108497 | A1 * | 4/2020 | Miyazaki ............... | B25J 15/045 |
| 2020/0316791 | A1 * | 10/2020 | Sirkett ................. | B25J 15/0475 |
| 2022/0063037 | A1 * | 3/2022 | FitzPatrick .......... | B25J 19/0058 |

* cited by examiner

*Primary Examiner* — Paul T Chin
(74) *Attorney, Agent, or Firm* — Quinn IP Law

(57) ABSTRACT

Presented are automatic end-of-arm tool changing devices, methods for making/using such tool changing devices, and automated robotic systems with such tool changing devices. A tool changing device for an automated robotic system includes a quick-change (QC) interlock subassembly that attaches to an end effector. The QC subassembly includes a housing, one or more locking pins movable on the QC housing, and one or more anchor pins projecting from the QC housing. A finger block (FB) subassembly, which performs a task on a target object, includes a housing, a robot tool mounted to the FB housing, and one or more key slots and one or more pin holes in the FB housing. Each key slot receives an anchor pin; once the anchor pin is slid to a locking end of the key slot, each locking pin automatically slides into a pin hole to thereby lock together the QC and FB subassemblies.

20 Claims, 6 Drawing Sheets

AUTOMATIC END-OF-ARM TOOL CHANGERS FOR AUTOMATED ROBOTIC SYSTEMS

TECHNICAL FIELD

The present disclosure relates generally to robotic systems. More specifically, aspects of this disclosure relate to automated gantry-style "pick-and-place" robotic systems for high-speed, high-precision movement of laboratory containers and other target objects.

BACKGROUND

Robots are mechanized programmable tools used to replace human work in a wide variety of applications, including autonomous and semi-autonomous manufacturing processes and laboratory operations. For industrial applications, robots are computer-controlled systems generally employed to perform repetitive tasks in a precise and time-efficient manner. In a typical laboratory setting, for example, a multi-axis, gantry-style robot performs a repetitive sequence of point-to-point movements, coming to a stop at each point to perform a particular task. For instance, a laboratory automation system comprises a number of pre-analytical, analytical and/or post-analytical stations in which specimens contained in test tubes or sample containers are processed. In practice, several test tubes may be placed in a tube rack for efficient handling. During processing, test tubes are typically retrieved or "picked" from an initial position within a rack, then transferred sequentially to one or more intermediate positions at various testing and processing stations, and lastly moved to a final position within the same rack or a different rack.

As the demand for fully autonomous machines has increased in recent years, robotics manufacturers have persisted to innovate in order to keep up with new, more complex customer requirements. Among these innovations are automatic tool changing devices—also known as reconfigurable end-effectors—that minimize or eliminate the need for an operator to continuously supervise the machine and change the robot tooling to accommodate different machine tasks. Conventional automatic tool changing devices, however, are overly complex and large with a concomitant increase in machine cost, manufacturing time, and warranty-related repair and replacement. In addition, such complicated and bulky designs increase packaging and floor space requirements while adding to operator calibration time and reducing system efficiency.

SUMMARY

Presented herein are automatic end-of-arm tool changing devices, methods for manufacturing and methods for operating such tool changing devices, and automated robotic systems equipped with such tool changing devices. By way of non-limiting example, compact and simplified "quick-change" end-effector designs enable automatic swapping of end-or-arm robot tooling with reduced device cost and increased system efficiency. For automated laboratory systems, such as chemical, pharmaceutical, and biotech benchtop testing stations, the reduced footprint and streamlined design also helps to enable end-to-end automation involving different lab ware types in a batch run, from small test tubes to large specimen containers. Other attendant benefits may include reduced system calibration requirements, minimized operator supervision, and decreased system downtime and warranty-related repairs and replacements.

A representative automatic end-of-arm tool changing device may include or consist essentially of three components: a quick-change interlock subassembly, a finger block subassembly, and a finger dock subassembly. For instance, the quick-change (QC) interlock subassembly may be a bipartite construction that movably mounts to a gripper end effector, e.g., of a gantry-style, pick-and-place robot. The QC interlock employs a pair of QC housing blocks with mushroom-head pins projecting therefrom for locking into complementary key slots in a mating finger block subassembly. A spring-loaded locking pin projects from each QC housing block for insertion into complementary through-holes in the finger block subassembly. Optional magnets may be employed for operatively aligning the quick-change interlock subassembly with the finger block subassembly.

Similar to the quick-change interlock, a finger block (FB) subassembly may be a bipartite construction with a pair of FB housing blocks, each of which is fabricated with one or more countersunk key slots for receiving the quick-change interlock's mushroom-head pins. A through-hole in each FB housing block receives one of the QC locking pins to restrict inadvertent horizontal movement and prevent inadvertent disengagement of the FB subassembly from the QC subassembly. Magnets are nested inside each FB housing block to locate and lock the FB housing block into correct positioning with respect to a housing block of the quick-change interlock. A pair of finger pins projects downward from each FB housing block for cooperatively lifting a target object, such as a test tube.

To nest a finger block subassembly when not in use, a finger dock (FD) subassembly includes an FD base that seats thereon and secures in place one or more pairs of FB housing blocks. The FD base mounts to a work surface of a benchtop testing station and includes a square array of holes for receiving the four finger pins of a mating set of FB housing blocks. Tapered side walls and end walls of the FD base slidably engage with and cooperatively align the FB housing blocks when the finger block subassembly is lowered into engagement with the finger dock. A pair of FD magnets are recessed into discrete locations of the base and each secured in place by a set screw. Each FD magnet interfaces with an FB magnet to locate and lock each FB housing block in a desired docking position on the base. A pair of release pins projects upward from the FD base; each release pin pushes on and thereby disengages a spring-loaded QC locking pin. Doing so unlocks the finger block subassembly from the quick-change interlock subassembly when the FB housing blocks are lowered onto the FD base. Dedicated sensors are attached to the base to detect the presence of each FB housing block in the dock.

Aspects of this disclosure are directed to automatic end-of-arm tool changing devices for autonomous and semi-autonomous systems. By way of example, a representative tool changing device for an automated robotic system includes a quick-change interlock subassembly that mates with one or more interchangeable finger block subassemblies. The QC subassembly attaches to a robotic end effector and includes a QC housing, one or more locking pins movably mounted to the QC housing, and one or more anchor pins projecting from the QC housing. Each FB subassembly is operable to perform a specific work task on a target object, such as gripping, lifting, stirring, sensing, filling, material working, etc. A FB subassembly includes an FB housing, one or more robot tools mounted to the FB housing, one or more key slots recessed into the FB housing, and one or more pin holes in the FB housing. To mechanically attach the QC subassembly to an FB subassembly, the QC housing is juxtaposed with the FB housing, an anchor pin is inserted into a receiving end of a complementary key slot, and the anchor pin is slid into a locking end of the key slot. Sliding the anchor pin into the locking end of the key slot allows a QC locking pin to automatically slide into a complementary pin hole; doing so locks the QC subassembly to the FB subassembly.

Additional aspects of this disclosure are directed to automated robotic systems equipped with automatic end-of-arm tool changing devices. As used herein, the terms "robot" and "robotic system" may be used interchangeably and synonymously to reference any logically relevant automated system, be it fully or partially autonomous, benchtop, freestanding, gantry-style, wall or ceiling-mounted, or mobile, and germane to all suitable applications. In an example, an automated robotic system includes a work surface that supports, among other things, one or more target objects, such as a rack of test tubes. A gantry system with a multi-axis suspension assembly is located above and movable across the work surface, e.g., in two principal axes (horizontal y-axis and z-axis). An end effector is suspended from the multi-axis suspension assembly and movable towards and away from the work surface, e.g., along a third principal axis (vertical x-axis).

Continuing with the discussion of the above example, the automated robotic system also includes an automatic end-of-arm tool changing device. This tool changing device includes a quick-change interlock subassembly that is attached to and mechanized by the end effector. The QC subassembly includes a QC housing, a locking pin movably mounted to the QC housing, and an anchor pin projecting from the QC housing. One or more finger block subassemblies are releasably attachable to the QC subassembly. Each FB subassembly includes an FB housing, a robot tool mounted to the FB housing and operable to grasp a target object, a key slot recessed into the FB housing, and a pin hole in the FB housing. The key slot slidably receives the anchor pin; once the anchor pin is slid from a receiving end to a locking end of the key slot, the locking pin automatically slides into the pin hole to thereby releasably lock the QC subassembly to the FB subassembly.

Other aspects of this disclosure are directed to manufacturing processes, control logic, and computer-readable media (CRM) for making or using any of the disclosed systems, machines, and/or devices. In an example, a method is presented for assembling a tool changing device for an automated robotic system. This representative method includes, in any order and in any combination with any of the above and below disclosed options and features: attaching a quick-change interlock subassembly to an end effector, the QC subassembly including a QC housing, a locking pin movably mounted to the QC housing, and an anchor pin projecting from the QC housing; positioning the QC subassembly adjacent a finger block subassembly configured to perform a work task on a target object, the FB subassembly including an FB housing, a robot tool mounted to the FB housing, a key slot recessed into the FB housing, and a pin hole in the FB housing; inserting the anchor pin into a receiving end of the key slot; sliding the anchor pin to a locking end of the key slot to thereby mechanically mount the FB subassembly to the QC subassembly; and, in response to the anchor pin reaching the locking end of the key slot, automatically sliding the locking pin into the pin hole to thereby lock the QC subassembly to the FB subassembly.

For any of the disclosed devices, systems, and methods, the robotic end effector may include a pair of movable mounting interfaces (e.g., slidable T-blocks); the QC housing may include a pair of QC housing blocks, each of which rigidly mounts to a respective one of the end effector's movable mounting interfaces. As yet another option, the QC anchor pin may include a pair of mushroom-head pins, each of which is rigidly secured at a discrete location of the QC housing. In this instance, the key slot includes a pair of key slots, each of which is recessed into a discrete location of the FB housing and receives therein a respective one of the mushroom-head pins. Optionally, the QC interlock subassembly may include a QC magnet that is mounted to the QC housing and magnetically mates with an FB magnet mounted to the FB housing of the FB subassembly. Moreover, each QC locking pin may include a spring-biased locking pin that projects out from the QC housing.

For any of the disclosed devices, systems, and methods, the FB housing may include a pair of FB housing blocks, each of which releasably mounts to a respective one of the QC housing blocks. For instance, first and second spring-biased locking pins may be movably mounted to the first and second QC housing blocks, respectively, and first and second pairs of mushroom-head pins may project from the first and second QC housing blocks, respectively. In addition, first and second pairs of key slots may be recessed into the first and second FB housing blocks, respectively, for receiving the mushroom-head pins, and first and second pin holes may extend through the first and second FB housing blocks, respectively, for receiving the spring-biased locking pins. As yet a further option, the robot tool may include a set of (four) finger pins that cooperatively grip a target object For any of the disclosed devices, systems, and methods, the end-of-arm tool changing device may include one or more finger dock subassemblies that attach to a work surface of the automated robotic system and nest thereon one or more FB subassemblies. In an example, a FD subassembly includes an FD base that rigidly mounts to a work surface and has a top surface that releasably seats thereon a FB subassembly. In this instance, the FD base may include a complementary array of holes that receive therein the set of finger pins of the FB subassembly. The FD subassembly may also include one or more pairs of opposing tapered walls that project from the FD base and slidably engage the FB housing to thereby align the FB subassembly with the top surface of the FD base. The FD subassembly may include one or more FD magnets mounted to the FD base to magnetically mate with one or more FB magnets to help align the FB subassembly with the FD subassembly and aid in the release of the FB subassembly from the QC subassembly.

For any of the disclosed devices, systems, and methods, the pin hole in the FB subassembly may extend all the way through the FB housing. The QC locking pin may insert into a first (upper) end of the pin hole. In this instance, the FD subassembly may include one or more release pins that project upward from the FD base. Each release pin inserts into a second (bottom) end of one of the pin holes and disengages a QC locking pin from the FB pin hole to thereby unlock a FB subassembly from the QC subassembly. In this instance, the QC locking pin reengages the pin hole in a FB housing when the FB subassembly is pulled away from the FD base. The FD subassembly may also include a sensing device, such as a set of optical or magnetic proximity sensors. The sensing device is mounted to the FD base and operable to detect the presence of an FB housing when an FB subassembly is nested on the FD subassembly.

The above summary does not represent every embodiment or every aspect of this disclosure. Rather, the above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes any and all combinations and subcombinations of the elements and features described above and below.

Figure 1A:
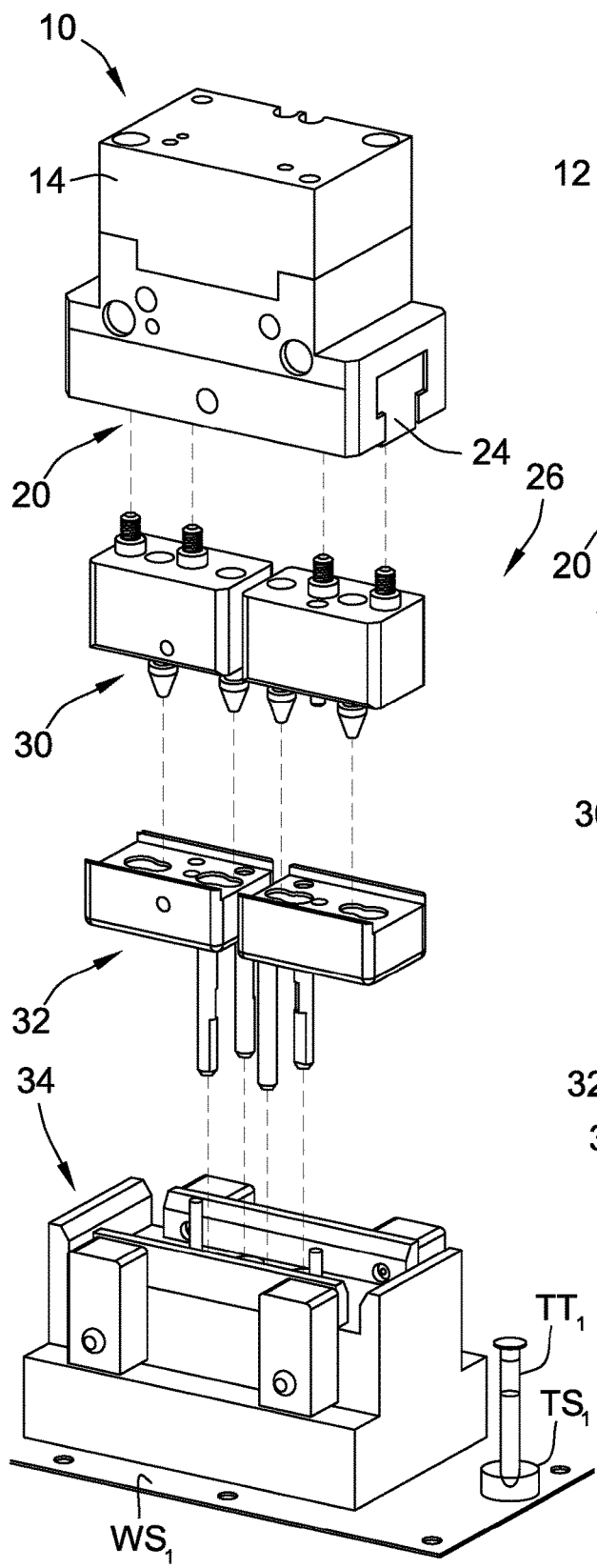
FIGS. 1A and 1B are partially exploded top-perspective view and bottom-perspective view illustrations, respectively, of a representative tool swap assembly with an automatic end-of-arm tool changing device in accord with aspects of the present disclosure.

Representative embodiments of this disclosure are shown by way of non-limiting example in the drawings and are described in additional detail below. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed, for instance, by the appended claims.

DETAILED DESCRIPTION

This disclosure is susceptible of embodiment in many different forms. Representative examples of the disclosure are shown in the drawings and herein described in detail with the understanding that these embodiments are provided as an exemplification of the disclosed principles, not limitations of the broad aspects of the disclosure. To that end, elements and limitations that are described, for example, in the Abstract, Technical Field, Background, Summary, Description of the Drawings, and Detailed Description sections, but not explicitly set forth in the claims, should not be incorporated into the claims, singly or collectively, by implication, inference, or otherwise. Moreover, the drawings discussed herein may not be to scale and are provided purely for instructional purposes. Thus, the specific and relative dimensions shown in the Figures are not to be construed as limiting.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and permutations thereof, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as up, down, front, back, left, right, vertical, horizontal, upward, downward, etc., may be with respect to an automated robotic machine when the machine is operatively oriented on a horizontal surface.

Figure 1B:
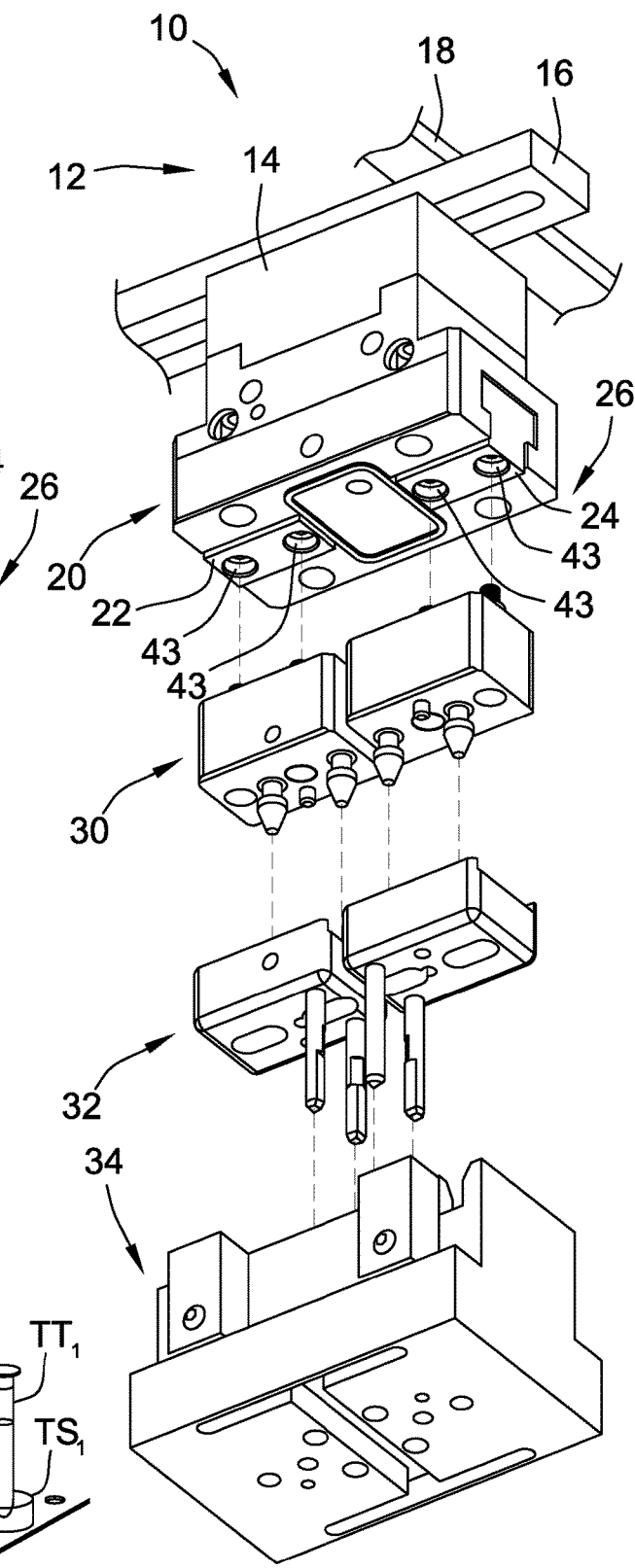

Referring now to the drawings, wherein like reference numbers refer to like features throughout the several views, there is shown in FIGS. 1A and 1B a representative automated system, which is designated generally at 10 and portrayed herein for purposes of discussion as a gantry-style, benchtop robot for autonomous laboratory testing. The illustrated system 10—also referred to herein as "robotic system" or "robot" for short—is merely an exemplary application with which novel aspects of this disclosure may be practiced. In the same vein, incorporation of the present concepts into a full-autonomous laboratory system should also be appreciated as a non-limiting implementation of disclosed features. As such, it will be understood that aspects of this disclosure may be applied to other robot architectures, may be implemented for any logically relevant application, and may be utilized for fully and partially autonomous systems alike. Moreover, only select components of the illustrated robotic systems and tool changing devices are described in additional detail herein. Nevertheless, the systems and devices discussed below may include numerous additional and alternative features, and other available peripheral components, for carrying out the various methods and functions of this disclosure.

With reference to FIG. 1A, the automated robotic system 10 includes a work surface $WS_1$—shown as a robot deck plate—that supports thereon a test tube $TT_1$ held in an upright position by a test tube stand $TS_1$. Located above the work surface $WS_1$ is a computer-automated gantry system, which is represented in FIG. 1B by a multi-axis suspension assembly 12 with a fixture sled 14 movable back-and-forth over the work surface $WS_1$ on y-axis and z-axis (horizontal) linear actuator rails 16 and 18, respectively. An end effector 20 is suspended from the multi-axis suspension assembly 12 and movable towards and away from the work surface $WS_1$ via a z-axis (vertical) linear actuator arm and control module (not shown). The end effector 20 includes a pair of movable mounting interfaces, namely first and second slidable T-blocks 22 and 24, for securely attaching any of an assortment of compatible robot tools to the end effector 20. Packaged inside the end effector 20 is a linear or rotary actuator, such as a pair of bi-directional DC stepper motors or a pair of multi-stroke, double-acting air cylinders, for driving the slidable T-blocks 22 and 24 in a reciprocating motion towards and away from each other. Rather than employ a gantry-style robotic system, the end effector 20 may be secured to a free-standing, articulating robot arm or onto a mobile robot assembly.

To minimize system complexity and footprint while increasing system efficiency and throughput, the automated robotic system 10 employs a compact and simplified automatic end-of-arm tool changing device 26 that facilitates expedited changeout of robot end effector tooling. The tool changing device 26 may be a bipartite or tripartite assembly composed of two or three main components: a quick-change (QC) interlock subassembly 30, a finger block (FB) subassembly 32 and, if desired, a finger dock (FD) subassembly

34. While shown with a single FB subassembly 32 that nests on a single FD subassembly 34, it is envisioned that the QC subassembly 30 is compatible with multiple interchangeable finger blocks that each nests on a distinct dock located at a discrete location on the robot system's work surface $WS_1$. In the same vein, the automated robotic system 10 may employ multiple end effectors and multiple quick-change tool swapping devices.

Figure 2A:
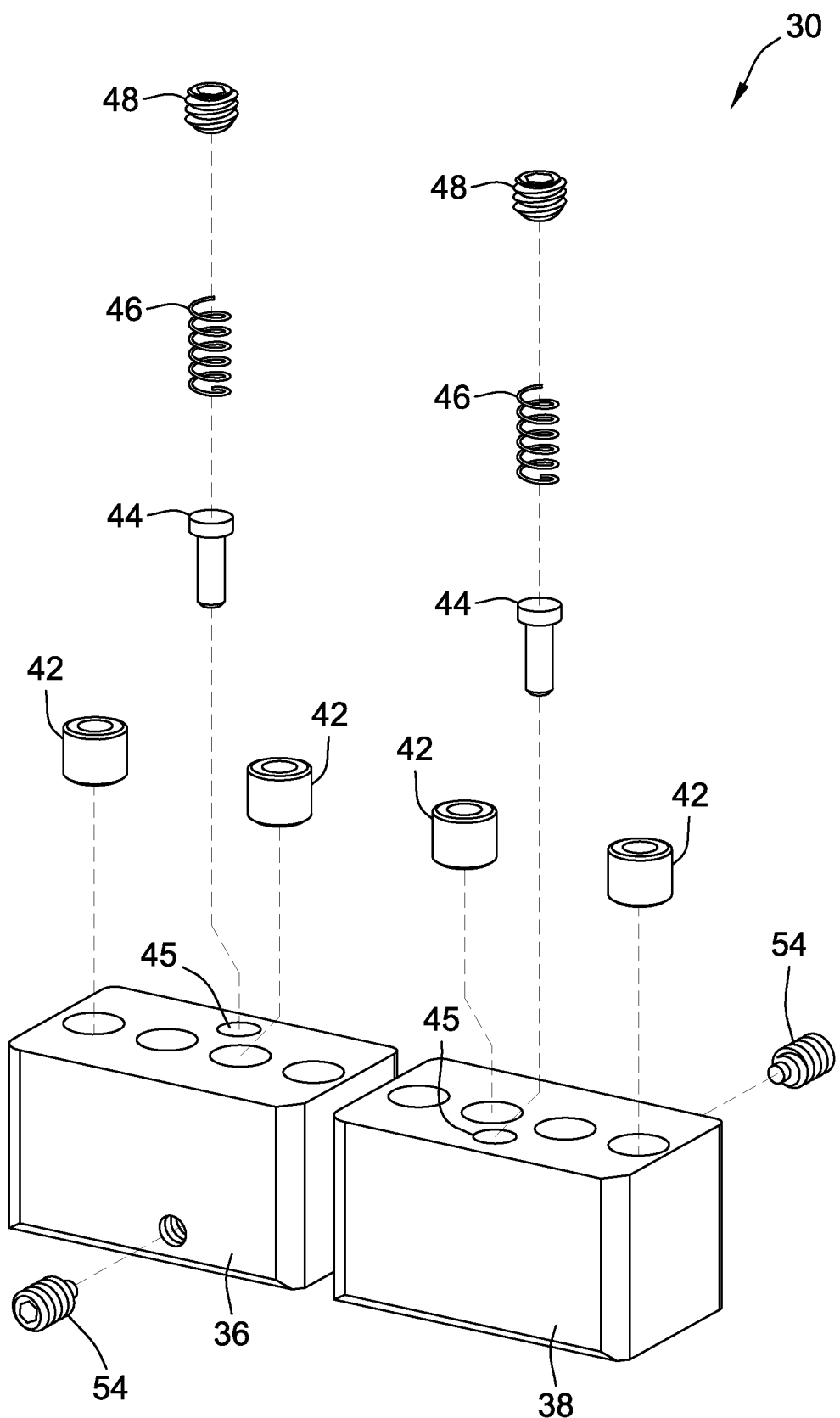
FIGS. 2A and 2B are partially exploded top-perspective view and bottom-perspective view illustrations, respectively, of a representative quick-change interlock subassembly of an automatic end-of-arm tool changing device in accord with aspects of the present disclosure.

The quick-change interlock subassembly 30 operatively attaches the tool changing device 26 to the end effector 20, e.g., such that the QC subassembly 30 and a mated FB subassembly 32 are manipulable by the end effector 20 and suspended from the gantry system's multi-axis suspension assembly 12. In accord with the illustrated example, the QC subassembly 30 employs a rigid, corrosion-resistant housing, portrayed in FIGS. 2A and 2B as stainless-steel QC housing blocks 36 and 38. Each housing block 36, 38 rigidly mounts to one of the slidable T-blocks 22 and 24 to translate rectilinearly back-and-forth in unison therewith on the end effector 20. By way of example, and not limitation, a pair of bolts 40 (FIG. 2B) is fed through complementary bolt holes 41 in each QC housing block 36, 38. The representative bolt holes 41 are portrayed as countersunk, unthreaded through-holes. The externally threaded shank of each bolt 40 is concomitantly passed through a centering sleeve 42 (FIG. 2A) and threaded into an internally threaded bolt hole 43 (FIG. 1B) in the bottom of a T-block 22, 24. The centering sleeves 42 are seated on top of the housing blocks 36, 38, interposed between the QC subassembly 30 and end effector 20, to facilitate operatively aligning the QC housing blocks 36, 38 on their individual T-blocks 22, 24.

In order to quickly and easily mate the end effector 20 with assorted robot tools, the quick-change interlock 30 is equipped with one or more male attachment elements for releasably attaching to one or more interchangeable finger blocks 32. For instance, an elongated locking pin 44 is movably mounted to each QC housing block 36, 38 and operable to selectively lock the QC subassembly 30 to the FB subassembly 32. As shown, the locking pins 44 are fed through complementary QC pin holes 45 in the QC housing blocks 36, 38. The representative pin holes 45 are portrayed as countersunk, partially threaded through-holes. A biasing member, such as a helical compression spring 46, is also packaged inside the pin holes 45, seated on the head of each locking pin 44, and secured in place via a threaded set screw 48. The set screws 48 compress the helical springs 46 against the locking pins 44 such that the springs 46 bias proximal tips of the pins 44 out from a bottom surface of the QC housing blocks 36, 38, as best seen in FIG. 1B.

Figure 2B:
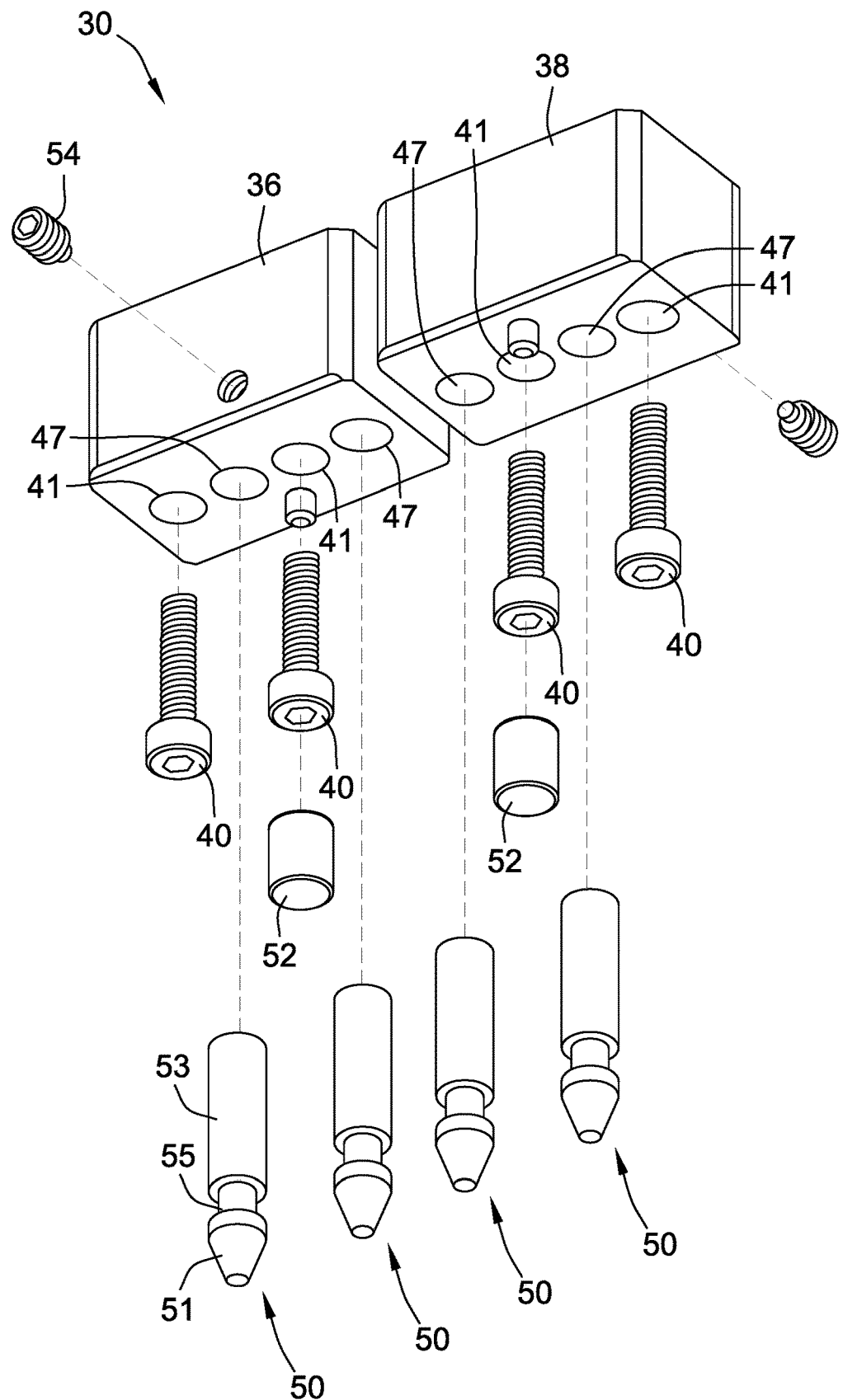

In addition to the locking pins 44, one or more anchor pins 50 mount to each QC housing block 36, 38 to mechanically couple the QC subassembly 30 to the FB subassembly 32. As shown in FIG. 2B, the anchor pins 50 are embodied as mushroom-head pins with a frustoconical head 51 that is coupled to a mounting shank 53 via a reduced-diameter neck 55. Each anchor pin 50 is rigidly secured at a discrete location of the QC subassembly 30, e.g., via press-fitting a distal (upper) end of the mounting shank 53 into an unthreaded, friction-fit anchor through-hole 47. When properly secured in place, the head 51 and neck 55 of each anchor pin 50 project from a bottom surface of the QC housing blocks 36, 38, as best seen in FIG. 1B. To help align the QC subassembly 30 with the FB subassembly 32 when mechanically coupled together, an optional QC magnet 52 may be mounted to each QC housing block 36, 38, e.g., fastened into one of the bolt holes 41 underneath a respective bolt 40 by a set screw 54.

Figure 3A:
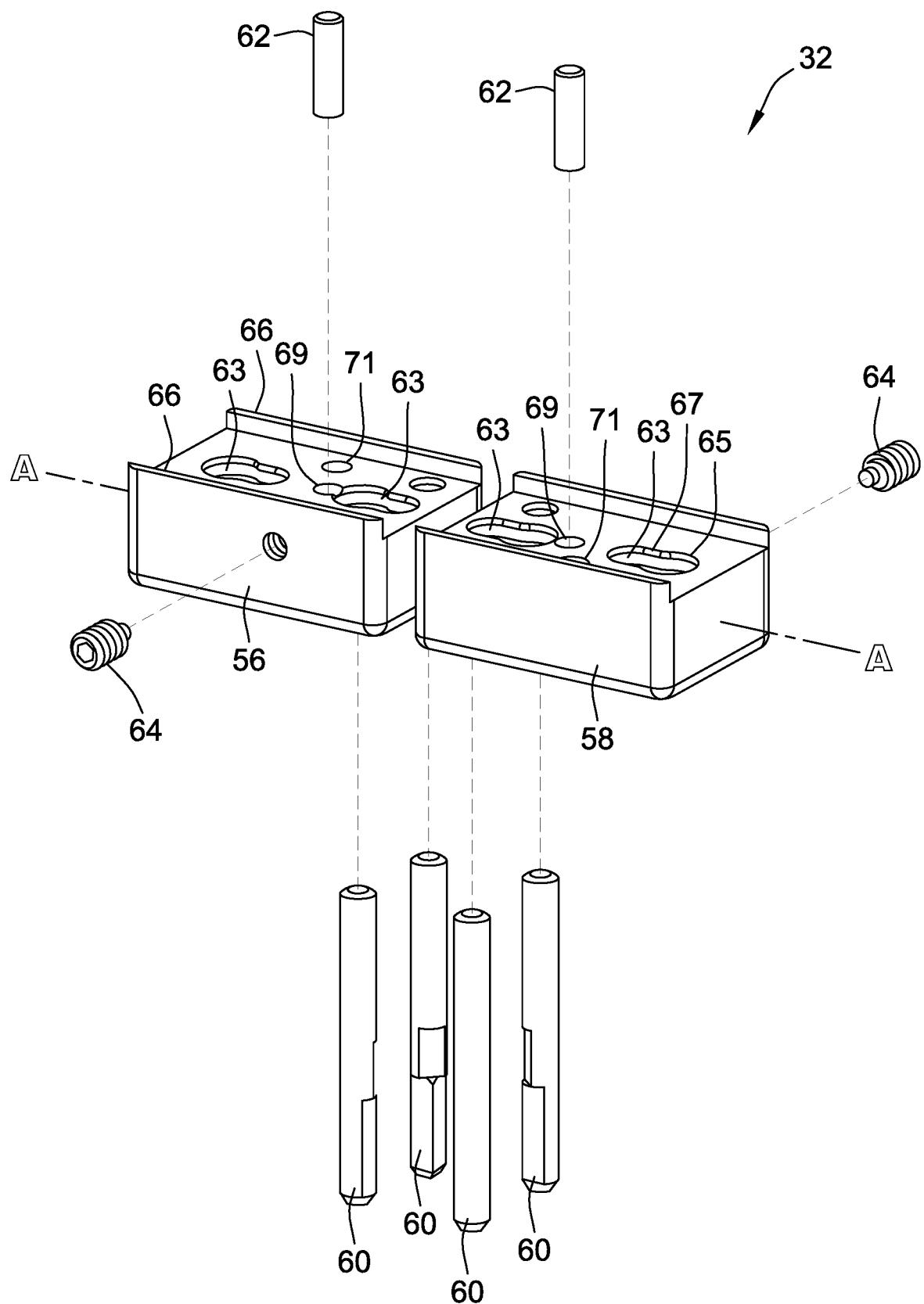
FIGS. 3A and 3B are partially exploded top-perspective view and bottom-perspective view illustrations, respectively, of a representative finger block subassembly of an automatic end-of-arm tool changing device in accord with aspects of the present disclosure.
Figure 3B:
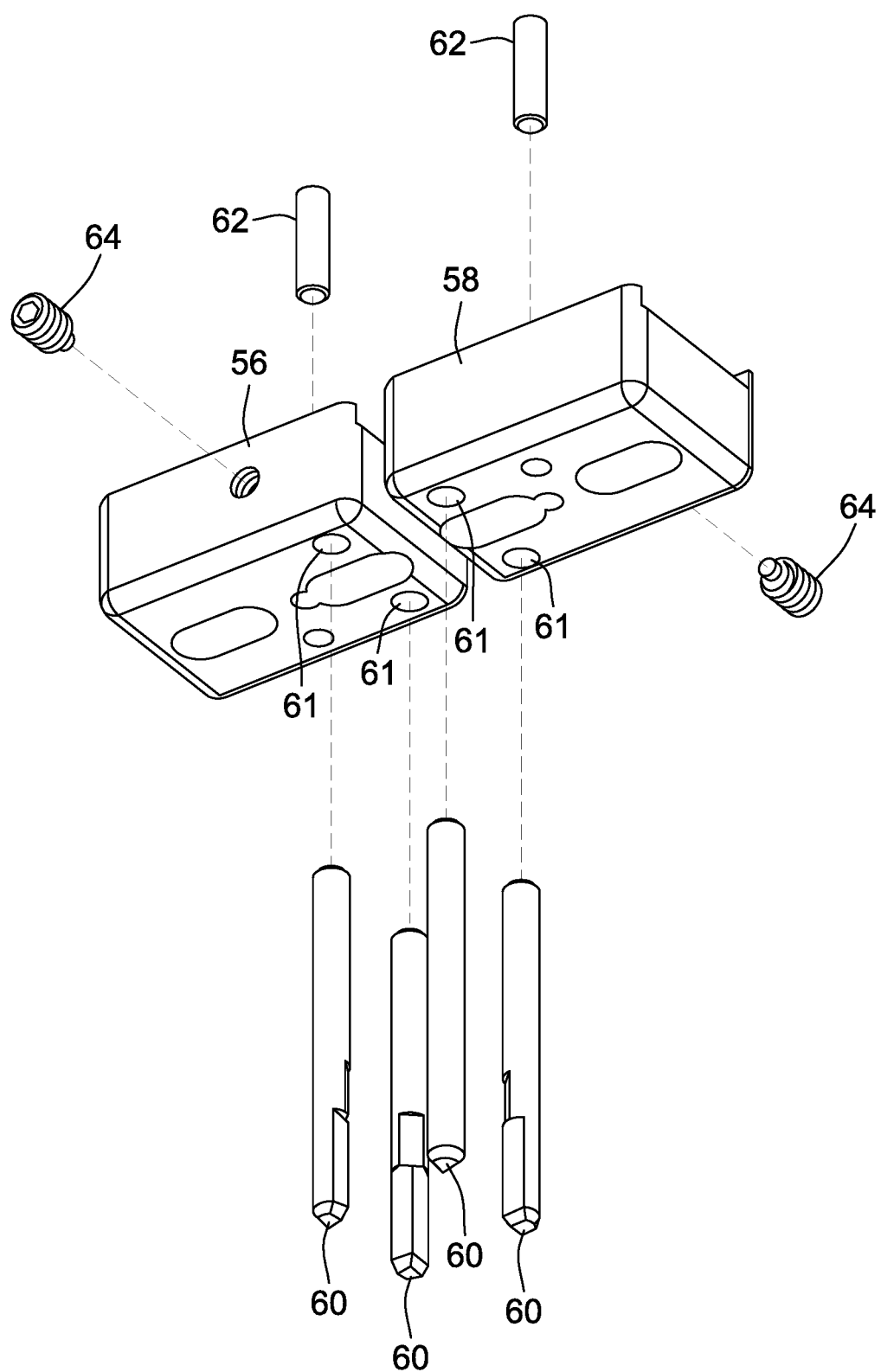

To enable the automated robotic system 10 to perform desired work tasks on different target objects, the system 10 may be provided with interchangeable finger blocks equipped with an assortment of robot tools. As a non-limiting example, the FB subassembly 32 employs a rigid, corrosion-resistant housing, portrayed in FIGS. 3A and 3B as stainless-steel FB housing blocks 56 and 58. For a gripper tool configuration, four elongated finger pins 60 are rigidly mounted to the FB housing blocks 56, 58—one pair per block—and arranged in a square array of mutually parallel pins. A distal (upper) end of each finger pin 60 may be press-fit into a bottom end of a complementary finger hole 61 (FIG. 3B) in the FB housing blocks 56, 58. The representative finger holes 61 are portrayed as unthreaded friction-fitting through-holes. When the end effector 20 is lowered into proximity with the test tube stand $TS_1$, the slidable T-blocks 22, 24 contemporaneously draw the FB housing blocks 56, 58 away from each other and the finger pins 60 are circumferentially spaced around the test tube $TT_1$. The T-blocks 22, 24 then move the FB housing blocks 56, 58 towards each other such that pins 60 cooperatively press against and grip an upper end of the test tube $TT_1$; the end effector 20 may then lift the test tube $TT_1$ off of the test tube stand $TS_1$. It should be appreciated that a finger block may provision other gripping devices and, to that end, alternative tooling configurations.

In order to quickly and easily mate with the end effector 20, the finger block 32 is fabricated with one or more female attachment elements for releasably attaching to the quick-change interlock 30. For instance, one or more key slots 63 are recessed into the upper surface of each FB housing block 56, 58; each key slot 63 slidably receives therein a respective one of the anchor pins 50 to thereby mechanically couple the QC subassembly 30 to the FB subassembly 32. As shown, four oblong key slots 63—two per block—are axially aligned along a longitudinal center axis A-A of the FB subassembly 32 (i.e., the axis along which the QC housing blocks 36, 38 move). When the QC subassembly 30 is lowered into (or lifted out of) engagement with the FB subassembly 32, the frustoconical heads 51 of the anchor pins 50 insert into (or extract from) enlarged-diameter receiving ends 65 (FIG. 3A) of the key slots 63. The anchor pins 50 are then slid into (or out of) reduced-diameter locking ends 67 (FIG. 3A) of the key slots 63 such that the upper face of the FB housing blocks 56, 58 noose the anchor pin necks 55 and trap the frustoconical heads 51 within the key slots 63. Doing so prevents vertical displacement of the FB subassembly 32 with respect to the QC subassembly 30. A pair of beveled-corner side walls 66 may project vertically upwards from opposing sides of each FB housing block 56, 58 and slidably engage a QC housing block 36, 38 to help align the QC subassembly 30 when lowered onto the FB subassembly 32.

Upon mechanically coupling the FB housing blocks 56, 58 with the QC housing blocks 36, 38, the QC subassembly 30 automatically locks to the FB subassembly 32. Fabricated into each FB housing block 56, 58, for example, is a FB pin hole 71 for receiving the proximal tip of one of the locking pins 44 projecting from the bottom surface of the QC housing block 36, 38. The representative FB pin holes 71 are portrayed as unthreaded through-holes that open at the top and bottom surfaces of the FB housing blocks 56, 58. After the anchor pins 50 are inserted into the receiving ends 65 of the key slots 63, and then slid to the locking ends 67 of the key slots 63, the spring-biased locking pins 44 automatically align with and slide into the FB pin holes 71 to thereby lock together the QC and FB subassemblies 30, 32. Optional FB magnets 62 may be mounted to each FB housing block 36, 38, e.g., fastened into respective FB magnet holes 69 by set screws 64. When placed face to face, each FB magnet 62 magnetically mates with a QC magnet 52 to operatively align a FB housing block 56, 58 with a QC housing block 36, 38. When mechanically coupled and locked together, each FB housing block 56, 58 rigidly mounts to one of the QC housing blocks 36, 38 to translate rectilinearly back-and-forth in unison therewith on the end effector 20.

Figure 4:
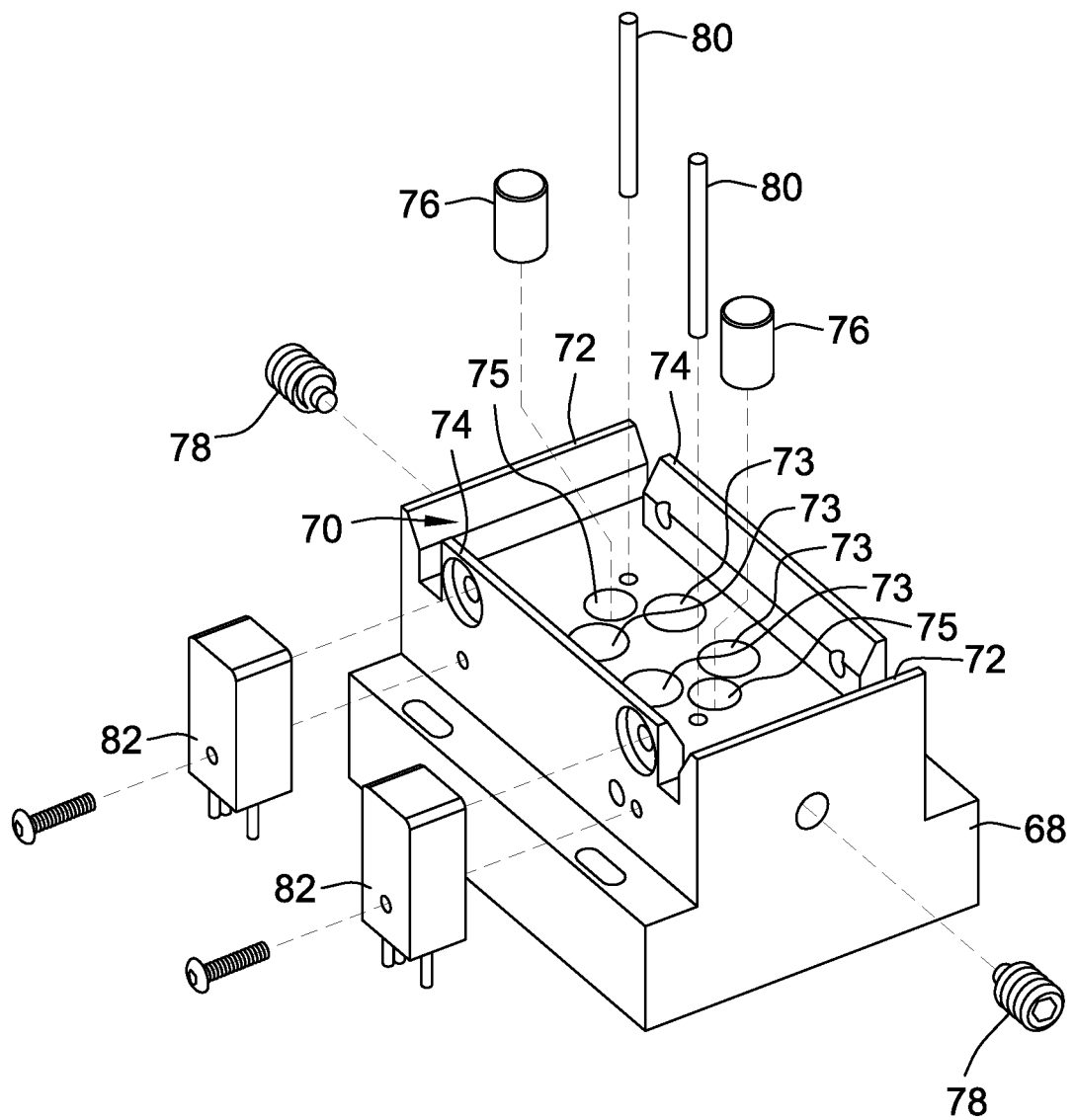
FIG. 4 is a partially exploded top-perspective view illustration of a representative finger dock subassembly of an automatic end-of-arm tool changing device in accord with aspects of the present disclosure.

Turning next to FIG. 4, one or more finger blocks may be stowed on a complementary finger dock subassembly 34 when the finger blocks are not in use by the end effector 20. The FD subassembly 34 includes a rigid, polymeric FD base 68 that rigidly mounts, e.g., via threaded fasteners, rivets, or adhesives, to the work surface $WS_1$ of the automated robotic system 10. For a single nest application, a top surface of the FD base 68 has a recessed pocket 70 that is designed to releasably seat thereon the FB subassembly 32. A square array of complementary FD finger holes 73 receive the four finger pins 60 of the FB subassembly 32. The representative FD finger holes 73 are portrayed in the Figures as unthreaded through-holes. A pair of tapered ends walls 72 project upward from longitudinal ends of the FD base 68 and a pair of tapered side walls 74 project upward from lateral sides of the FD base 68. When the FB subassembly 32 is being lowered onto the FD subassembly 34, these tapered walls 72, 74 slidably engage the FB housing blocks 56, 58 and thereby align the FB subassembly 32 with the recessed pocket 70 in the top surface of the FD base 68. Although shown as a single finger dock nesting thereon a single finger block, the automatic end-of-arm tool changing device 26 may employ multiple finger docks or a single finger dock that nests multiple finger blocks. Likewise, it is envisioned that the FD base 68 may accommodate greater or fewer than four finger pins and/or finger pins of different shapes and sizes.

An optional pair of FD magnets 76 may be mounted to the FD base 68, e.g., fastened into respective magnet holes 75 by set screws 78. As the FB subassembly 32 is being placed onto the FD base 68, e.g., via the end effector 20, top ends of the FD magnets 76 magnetically mate with bottom ends of the FB magnets 62 exposed from the FB magnet holes 69. In so doing, the individual FB housing blocks 56, 58 are correctly positioned on the FD base 68 and retained in place by the magnets 76 and under the force of gravity. A sensing device, which may be in the nature of first and second optical or magnetic proximity sensors 82, is attached to the FD base 68 and operable to detect the FB housing blocks 56, 58 when the FB subassembly 32 is nested on the FD subassembly 34.

The FD subassembly 34 includes two elongated release pins 80 that are staked inside release pin holes (FIG. 4; not labelled) and project upward from the top surface of the FD base 68. As the FB subassembly 32 is laid on top of the FD base 68, the release pins 80 insert into the FB pin holes 71 and push the quick-connect interlock's spring-biased locking pins 44 out from the pin holes 71. By this means, the FD subassembly 34 automatically unlocks the FB subassembly 32 from the QC subassembly 30 such that the QC subassembly 30 can be mechanically decoupled and removed from the FB subassembly 32. To remove the FB subassembly 32 from the FD subassembly 34, the FB subassembly 32 is mechanically coupled to the QC subassembly 30 via the anchor pins 50, as described above. The end effector 20 then lifts the mated QC and FB subassemblies 30, 32 off of the FD base 68; this removes the release pins 80 from the FB pin holes 71 thus allowing the spring-biased locking pins 44 to insert into the pin holes 71.

Also presented herein are methods for manufacturing and methods for operating an automated robotic system. In an example, a method is presented for assembling a tool changing device for an automated robotic system. As described above, the automated robotic system includes one or more work surfaces and an end effector movable with respect to at least one work surface. The work surface supports thereon, among other things, one or more target objects, such as a rack of test tubes, each having a test tube shape and size, and a rack of specimen containers, each having a container shape and size distinct from the shape. The representative method includes attaching a quick-change interlock subassembly to a robot end effector. The QC subassembly includes a QC housing, a locking pin movably mounted to the QC housing, and an anchor pin projecting from the QC housing.

Continuing with the discussion of the above example method, the QC subassembly is positioned, e.g., via the robot end effector, adjacent a finger block, which may be nested in a FD subassembly. As described above, the FB subassembly is designed to perform a predefined work task on one or more of the target objects, such as picking up and placing a test tube in a testing machine. The FB subassembly includes an FB housing, a robot tool mounted to the FB housing, a key slot recessed into the FB housing, and a pin hole in the FB housing. To mechanically mount the FB subassembly to the QC subassembly, the anchor pin is inserted into a receiving end of the key slot; the anchor pin is then slid, e.g., horizontally, to a locking end of the key slot. In order to lock the FB subassembly and QC subassembly together, the locking pin automatically slides into the pin hole in response to the anchor pin reaching the locking end of the key slot and, in some implementations, the FB subassembly being lifted off of the FD subassembly.

For at least some embodiments, attaching the QC interlock subassembly to the end effector may include rigidly mounting first and second QC housing blocks to first and second movable mounting interfaces, respectively, of the end effector. As yet a further option, positioning the QC interlock subassembly adjacent the FB subassembly may include nesting the FB subassembly on a top surface of a base of a finger dock subassembly attached to a work surface of the automated robotic system. Moreover, automatically sliding the locking pin into the pin hole may include pressing the QC housing against the FB housing, aligning the locking pin with the pin hole, and biasing the locking pin into the pin hole via a spring mounted to the FB housing. Automatically sliding the locking pin into the pin hole may further include removing a release pin from the pin hole.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A tool changing device for an automated robotic system, the automated robotic system including a work surface and an end effector movable with respect to the work surface, the work surface supporting thereon a target object, the tool changing device comprising:
- a quick-change (QC) interlock subassembly configured to attach to the end effector, the QC subassembly including a QC housing, a locking pin movably mounted to the QC housing, and an anchor pin projecting from the QC housing; and
- a finger block (FB) subassembly configured to perform a work task on the target object, the FB subassembly including an FB housing, a robot tool mounted to the FB housing, a key slot recessed into the FB housing, and a pin hole in the FB housing, wherein the key slot slidably receives the anchor pin and, once slid to a locking end of the key slot, the locking pin automatically slides into the pin hole to thereby lock together the QC and FB subassemblies.

2. The tool changing device of claim 1, wherein the end effector includes first and second movable mounting interfaces, and wherein the QC housing includes first and second QC housing blocks each configured to rigidly mount to the first and second movable mounting interfaces, respectively.

3. The tool changing device of claim 1, wherein the anchor pin includes first and second mushroom-head pins each rigidly secured at a discrete location of the QC housing, and wherein the key slot includes first and second key slots each recessed into a discrete location of the FB housing and receiving therein a respective one of the mushroom-head pins.

4. The tool changing device of claim 1, wherein the QC subassembly further includes a QC magnet mounted to the QC housing, and wherein the FB subassembly further includes an FB magnet mounted to the FB housing and configured to magnetically mate with the QC magnet.

5. The tool changing device of claim 1, wherein the QC subassembly further includes a spring biasing the locking pin out from the QC housing.

6. The tool changing device of claim 1, wherein the QC housing includes first and second QC housing blocks, and wherein the FB housing includes first and second FB housing blocks each configured to releasably mount to the first and second QC housing blocks, respectively.

7. The tool changing device of claim 6, wherein the locking pin includes first and second spring-biased locking pins movably mounted to the first and second QC housing blocks, respectively, the anchor pin includes first and second pairs of mushroom-head pins projecting from the first and second QC housing blocks, respectively, the key slot includes first and second pairs of key slots recessed into the first and second FB housing blocks, respectively, and the pin hole includes first and second pin holes extending through the first and second FB housing blocks, respectively.

8. The tool changing device of claim 1, wherein the robot tool includes a set of finger pins configured to grip the target object.

9. The tool changing device of claim 1, further comprising a finger dock (FD) subassembly configured to attach to the automated robotic system and nest thereon the FB subassembly.

10. The tool changing device of claim 9, wherein the FD subassembly includes an FD base configured to rigidly mount to the work surface, the FD base having a top surface configured to releasably seat thereon the FB subassembly.

11. The tool changing device of claim 10, wherein the robot tool includes a set of finger pins, and wherein the FD base further includes a complementary array of holes configured to receive therein the set of finger pins of the FB subassembly.

12. The tool changing device of claim 10, wherein the FD subassembly further includes opposing first and second tapered walls projecting from the FD base and configured to slidably engage the FB housing and thereby align the FB subassembly with the top surface of the FD base.

13. The tool changing device of claim 10, wherein the FD subassembly further includes an FD magnet mounted to the FD base, and wherein the FB subassembly further includes an FB magnet mounted to the FB housing and configured to magnetically mate with the FD magnet.

14. The tool changing device of claim 10, wherein the pin hole extends through the FB housing, and wherein the FD subassembly further includes a release pin projecting upward from the FD base and configured to insert into the pin hole and disengage the locking pin from the pin hole to thereby unlock the FB subassembly from the QC subassembly.

15. The tool changing device of claim 10, wherein the FD subassembly further includes a sensing device attached to the FD base and configured to detect the FB housing when the FB subassembly is nested on the FD subassembly.

16. The method of claim 15, wherein the end effector includes first and second movable mounting interfaces, and the QC housing includes first and second QC housing blocks, and wherein attaching the QC subassembly to the end effector includes rigidly mounting the first and second QC housing blocks to the first and second movable mounting interfaces, respectively.

17. The method of claim 15, wherein positioning the QC subassembly adjacent the FB subassembly includes nesting the FB subassembly on a top surface of a base of a finger dock (FD) subassembly attached to the automated robotic system.

18. The method of claim 15, wherein automatically sliding the locking pin into the pin hole includes pressing the QC housing against the FB housing, aligning the locking pin with the pin hole, and biasing the locking pin into the pin hole via a spring mounted to the FB housing.

19. An automated robotic system comprising:
- a work surface configured to support thereon a target object;
- a gantry system including a multi-axis suspension assembly located above and movable across the work surface;
- an end effector suspended from the multi-axis suspension assembly and movable towards and away from the work surface; and
- an automatic end-of-arm tool changing device, including:
  - a quick-change (QC) interlock subassembly attached to the end effector, the QC subassembly including a QC housing, a locking pin movably mounted to the QC housing, and an anchor pin projecting from the QC housing; and
  - a finger block (FB) subassembly including an FB housing, a robot tool mounted to the FB housing and configured to grasp the target object, a key slot recessed into the FB housing, and a pin hole in the FB housing,
- wherein the key slot slidably receives the anchor pin and, once the anchor pin is slid from a receiving end to a locking end of the key slot and the FB subassembly is moved away from the QC subassembly, the locking pin automatically slides into the pin hole to thereby releasably lock the QC subassembly to the FB subassembly.

20. A method of assembling a tool changing device for an automated robotic system, the automated robotic system including a work surface and an end effector movable with respect to the work surface, the work surface supporting thereon a target object, the method comprising:
- attaching a quick-change (QC) interlock subassembly to the end effector, the QC subassembly including a QC housing, a locking pin movably mounted to the QC housing, and an anchor pin projecting from the QC housing;
- positioning the QC subassembly adjacent a finger block (FB) subassembly configured to perform a work task on the target object, the FB subassembly including an FB housing, a robot tool mounted to the FB housing, a key slot recessed into the FB housing, and a pin hole in the FB housing;
- inserting the anchor pin into a receiving end of the key slot;
- sliding the anchor pin to a locking end of the key slot to thereby mechanically mount the FB subassembly to the QC subassembly; and
- sliding, automatically in response to the anchor pin reaching the locking end of the key slot, the locking pin into the pin hole to thereby lock together the QC and FB subassemblies.

\* \* \* \* \*